United States Patent
Uchida

(10) Patent No.: US 9,007,176 B2
(45) Date of Patent: Apr. 14, 2015

(54) PORTABLE ELECTRONIC APPARATUS AND CONTROL METHOD OF PORTABLE ELECTRONIC APPARATUS

(75) Inventor: Keisuke Uchida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 13/329,799

(22) Filed: Dec. 19, 2011

(65) Prior Publication Data

US 2012/0092133 A1   Apr. 19, 2012

Related U.S. Application Data

(63) Continuation of application No. PCT/JP2010/061170, filed on Jun. 30, 2009.

(30) Foreign Application Priority Data

Jun. 30, 2009  (JP) ................................. 2009-156002
Sep. 17, 2009  (JP) ................................. 2009-216069

(51) Int. Cl.
 *H04Q 5/22*     (2006.01)
 *G06K 7/10*     (2006.01)

(52) U.S. Cl.
 CPC .................................. *G06K 7/10059* (2013.01)

(58) Field of Classification Search
 CPC .......... G06K 7/10019; G06K 7/10029; G06K 7/10069; G06K 7/10079; H04W 74/0841
 USPC ............................ 370/345, 347, 447, 448, 508
 See application file for complete search history.

(56) References Cited

U.S. PATENT DOCUMENTS

2006/0031546 A1*  2/2006  Breitfuss et al. ............... 709/231
2007/0075838 A1*  4/2007  Powell ......................... 340/10.2

FOREIGN PATENT DOCUMENTS

EP    1 873 683    1/2008
JP    10-320515    12/1998

(Continued)

OTHER PUBLICATIONS

Singapore Search Report dated Jul. 9, 2012.
International Search Report for PCT/JP2010/061170.

(Continued)

*Primary Examiner* — Brian Zimmerman
*Assistant Examiner* — Thomas McCormack
(74) *Attorney, Agent, or Firm* — Oblon, McClelland, Maier & Neustadt, L.L.P.

(57) ABSTRACT

According to one embodiment, a portable electronic apparatus which generates random number and makes response at timing associated with the generated random number, including, a reception unit which receives initial response request from external device, recognition unit which recognizes total time frame number set in external device based on initial response request received by reception unit, random number generation unit which generates random number, communication detection unit which detects communication performed in another portable electronic apparatus, determination unit which monitors one time frame by using communication detection unit based on total time frame number recognized by recognition unit and random number generated by random number generation unit, and determines whether response to initial response request is to be transmitted to external device based on detection result obtained by communication detecting unit, and transmission unit which transmits response to external device based on determination result obtained by determination unit.

8 Claims, 8 Drawing Sheets

(56) References Cited

FOREIGN PATENT DOCUMENTS

| | | |
|---|---|---|
| JP | 2006-024119 | 1/2006 |
| JP | 2006-114054 | 4/2006 |
| JP | 2008-500600 | 1/2008 |
| JP | 2009-032003 | 2/2009 |

OTHER PUBLICATIONS

D. Baddeley; "ISO/IEC FCD 14443-3", Identification Cards—Countless Integrated Circuits Cards-Proximity Cards; Jun. 11, 1999, pp. 1-44.

International Preliminary Report on Patentability dated Feb. 23, 2012 for PCT/JP2010/061170.

European Search Report dated Jan. 20, 2014.

* cited by examiner

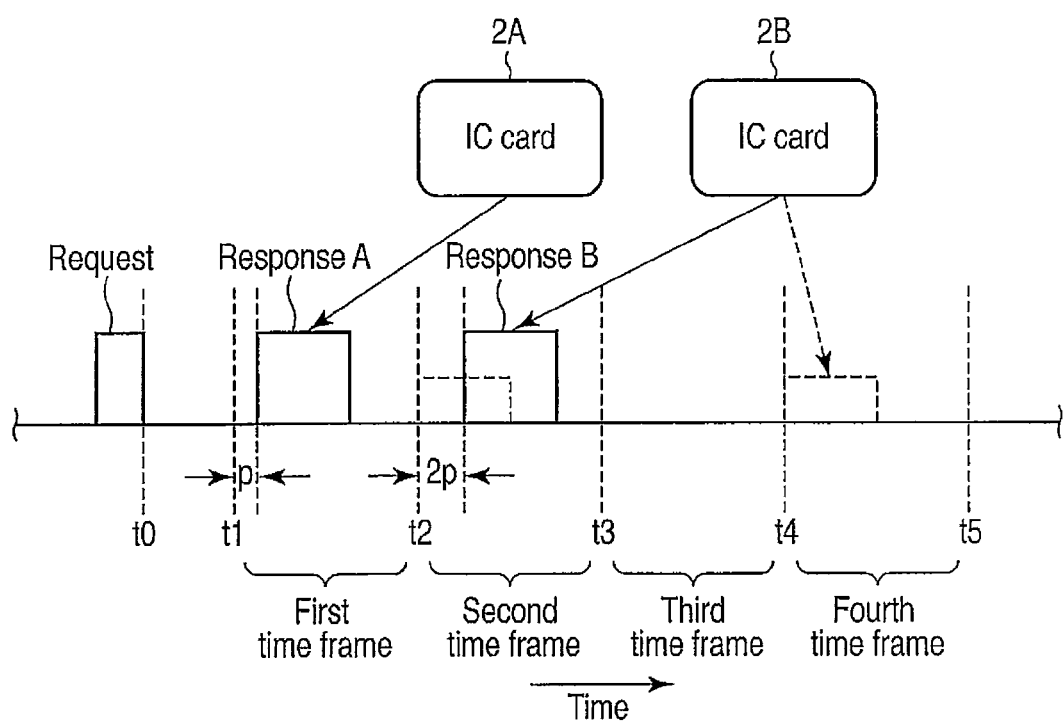
F I G. 6

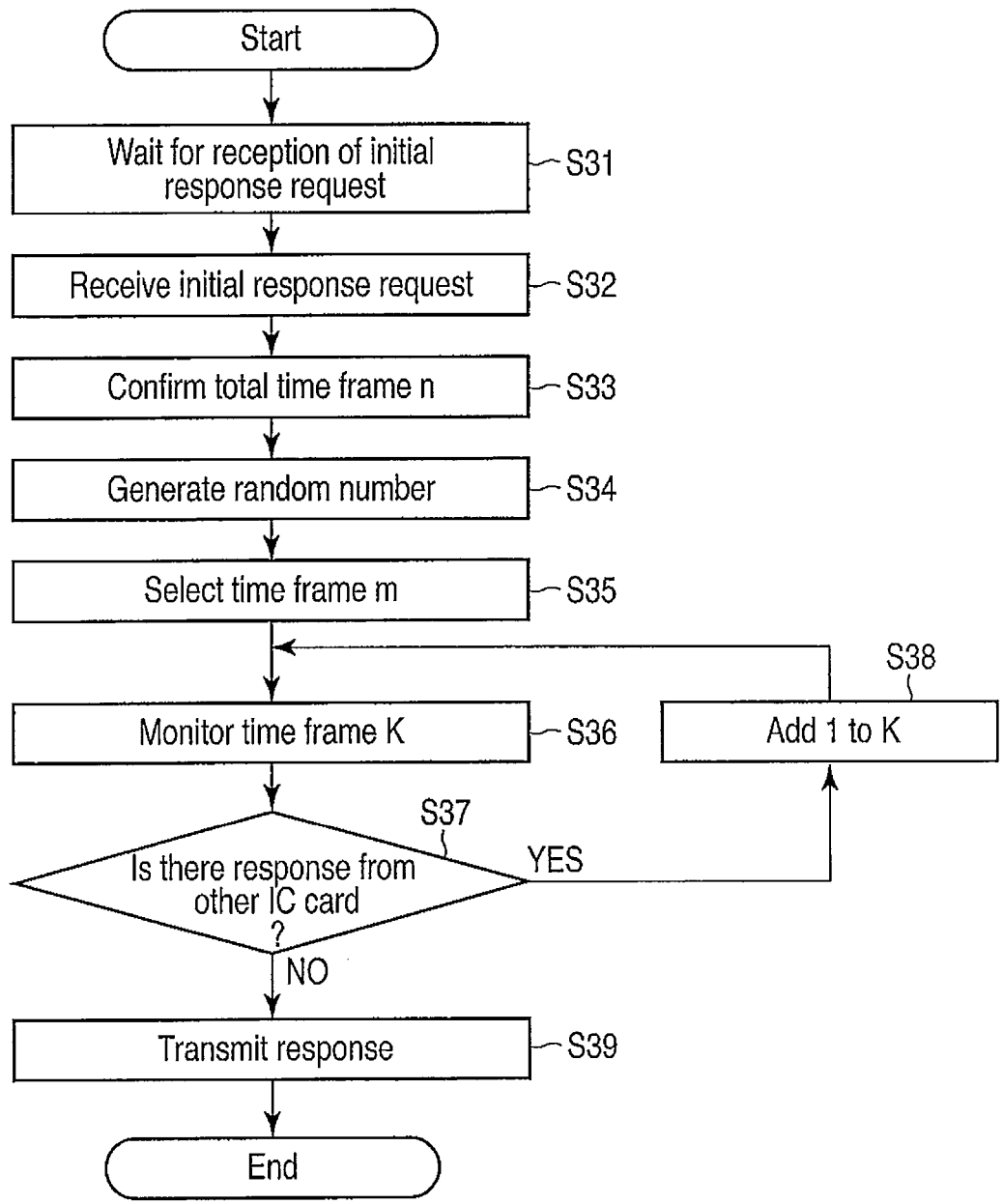
F I G. 7

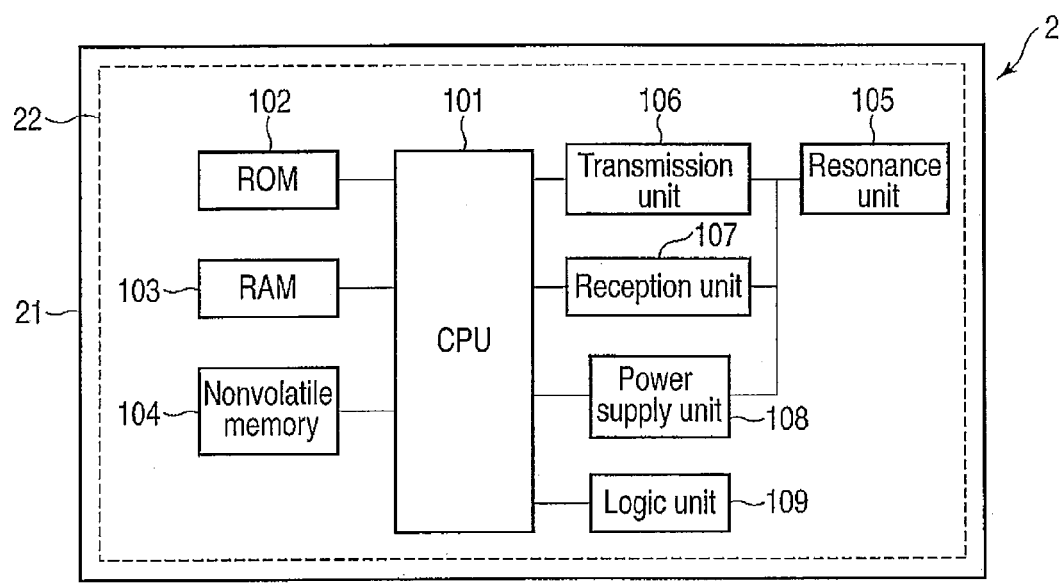
F I G. 8

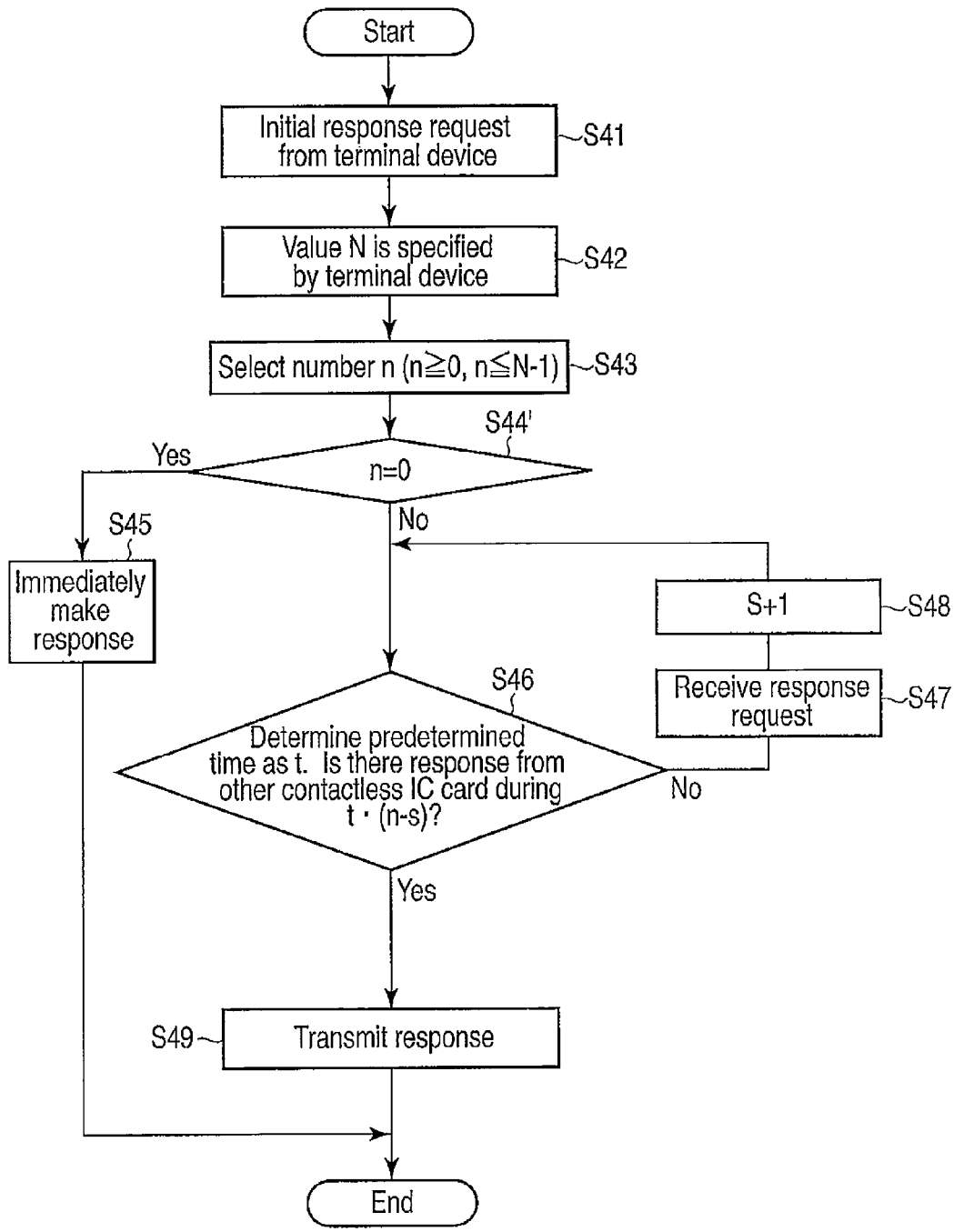
F I G. 11

PORTABLE ELECTRONIC APPARATUS AND CONTROL METHOD OF PORTABLE ELECTRONIC APPARATUS

CROSS REFERENCE TO RELATED APPLICATIONS

This application is a Continuation Application of PCT Application No. PCT/JP2010/061170, filed Jun. 30, 2010 and based upon and claiming the benefit of priority from prior Japanese Patent Applications No. 2009-156002, filed Jun. 30, 2009; and No. 2009-216069, filed Sep. 17, 2009, the entire contents of all of which are incorporated herein by reference.

FIELD

Embodiments described herein relate generally to, e.g., a portable electronic apparatus that realizes various kinds of processing by transmitting or receiving commands, and more particularly to a portable electronic apparatus that can respond to an initial response request at a higher speed and to a control method of the portable electronic apparatus.

BACKGROUND

In general, an IC card utilized as a portable electronic apparatus includes an card-like main body formed of, e.g., plastic and an IC module embedded in the main body. The IC module has an IC chip. The IC chip has a nonvolatile memory such as an EEPROM (Electrically Erasable Programmable Read-Only Memory) or a flash ROM that can hold data even though a power supply is not provided and a CPU that executes various kinds or arithmetic operations.

The IC card is superior in portability and can perform communication with external devices and complicated arithmetic operations. Further, since counterfeiting is difficult, using the IC card in a security system, electronic commerce and others to store highly-confidential information is assumed.

Furthermore, in recent years, an IC card that can transmit and receive data through contactless communication has generally spread. Such a contactless IC card includes an IC chip and an antenna. This contactless IC card operates by energizing the antenna in the card based on electromagnetic induction upon receiving a magnetic field generated from a reader/writer in an IC card processor which processes IC cards.

Meanwhile, when a plurality of IC cards are present in a communication enabled range, a situation where a terminal device cannot correctly recognize the plurality of IC cards in an initial response may possibly occur. To avoid this collision and correctly recognize the plurality of IC cards, the terminal device can execute anti-collision processing in, e.g., a time slot system, a slot marker system or any other system.

When executing the anti-collision processing based on the time slot system, the IC card processor sets a plurality of time frames and transmits an initial response request to an IC card. The IC card generates a random number, selects a time frame in accordance with the random number, and transmits a card ID stored in itself as a response to the IC card processor in the selected time frame. The IC card processor selects the IC card which executes processing based on the received card ID.

However, for example, if the plurality of IC cards select the same time frame, the IC card processor cannot normally receive card IDs.

Further, when executing the anti-collision processing based on the slot marker system, the IC card processor transmits an initial response request including a total number N of slots (time frames) to a plurality of IC cards. Each IC card uses a logic circuit to generate n (an integer) in N integers from 0 to (N−1), for example. When the generated n is 0, the IC card immediately sends an initial response. When the generated n is not 0, the IC card does not immediately send an initial response but sends the initial response at the time that it thereafter receives a slot marker command specifying the same slot as n generated by the contactless IC card is received from the terminal device.

When executing processing based on the time slot system, a time of a time frame set by the IC card processor is fixed. Therefore, for example, when a time frame that is not selected by the IC card is present before a time frame selected by the IC card, there is a problem that a communication time incurs waste.

Moreover, a portable electronic apparatus disclosed in the above-described patent document selects a time frame following a selected time frame when there is a response from another IC card in the selected time frame.

Additionally, as described above, in the slot marker system in the conventional anti-collision processing, the IC card sends an initial response when it receives a command from an external terminal that has specified the same slot as a selected value. Therefore, even in case of a slot in which no response is supplied from another contactless card, the contactless IC card must wait by without making a response, and there is a problem that an entire processing time becomes long.

BRIEF DESCRIPTION OF THE DRAWINGS

FIG. 6 is an explanatory diagram for schematically explaining another example of processing of an IC card according to a second embodiment;

FIG. 7 is a flowchart for explaining another example of the processing of the IC card according to the second embodiment;

FIG. 8 is an explanatory diagram for explaining another structural example of the IC card depicted in FIG. 1;

FIG. 11 is a flowchart showing an operation of the IC card 2 when responding to an initial response request in which 2 or a higher value is specified as the total number N of slots.

DETAILED DESCRIPTION

In general, according to one embodiment, a portable electronic apparatus which generates a random number and makes a response at a timing associated with the generated random number, including, a reception unit which receives an initial response request from an external device; a recognition unit which recognizes a total time frame number set in the external device based on the initial response request received by the reception unit; a random number generation unit which generates a random number; a communication detection unit which detects communication performed in another portable electronic apparatus; a determination unit which monitors one time frame by using the communication detection unit based on the total time frame number recognized by the recognition unit and the random number generated by the random number generation unit, and determines whether a response to the initial response request is to be transmitted to the external device based on a detection result obtained by the communication detecting unit; and a transmission unit which transmits the response to the external device based on a determination result obtained by the determination unit.

A portable electronic apparatus and a control method of a portable electronic apparatus according to a first embodiment will now be described hereinafter in detail with reference to the drawings.

Figure 1:
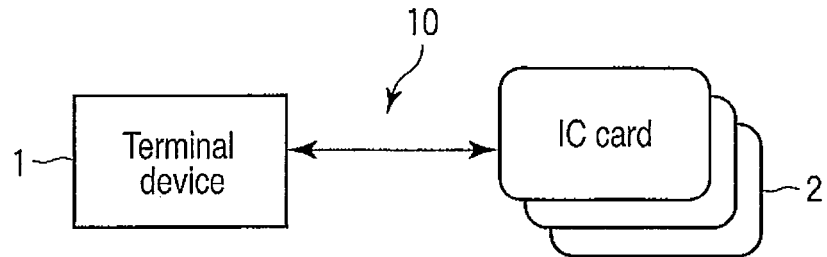
FIG. 1 is an explanatory diagram for explaining an example of a configuration of a processing system for a portable electronic apparatus according to an embodiment.

FIG. 1 is an explanatory diagram for explaining a structural example of an IC card processing system 10 according to the first embodiment.

As shown in FIG. 1, the IC card processing system 10 includes a processor (a terminal device) 1 for a portable electronic apparatus and a portable electronic apparatus (an IC card) 2. The terminal device 1 and the IC card 2 transmit/receive various kinds of data to/from each other through wireless communication.

Figure 2:
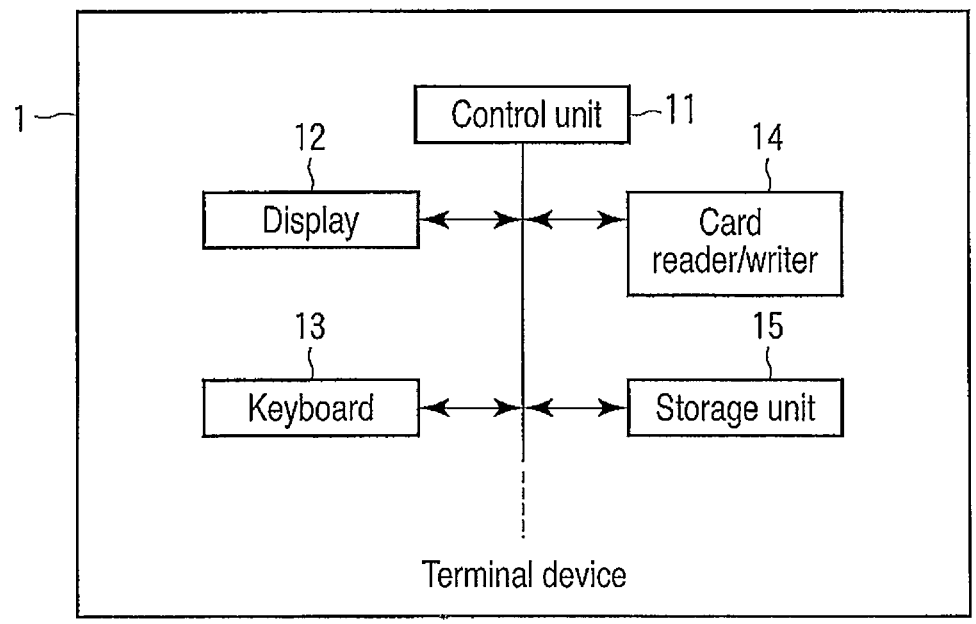
FIG. 2 is an explanatory diagram for explaining a structural example of a terminal device depicted in FIG. 1.

FIG. 2 is an explanatory diagram for explaining a structural example of the terminal device depicted in FIG. 1. As shown in FIG. 2, the terminal device 1 has a control unit 11, a display 12, a keyboard 13, a card reader/writer 14, a storage unit 15 and others.

The control unit 11 includes a CPU, an ROM, an RAM and others. The control unit 11 controls operations of the entire terminal device 1.

The display 12 displays various kinds of information under control of the control unit 11. The keyboard 13 receives an operation of the terminal device 1 by an operator as an operation signal.

The card reader/writer 14 is an interface device configured to execute communication with the IC card 2. The card reader/writer 14 executes supply of electric power, supply of clocks, reset control and data transmission/reception with respect to the IC card 2. That is, the card reader/writer 14 functions as a transmission/reception unit. The storage unit 15 stores a program and data of an operation executed by the control unit 11.

The control unit 11 inputs various kinds of commands with respect to the IC card 2 via the card reader/writer 14. When the IC card 2 has received, e.g., a data write command from the card reader/writer 14, it executes processing of writing the received data into an internal nonvolatile memory.

Furthermore, the control unit 11 transmits a read command to the IC card 2 to read data from the IC card 2. The control unit 11 executes various kinds of processing based on data received from the IC card 2.

The card reader/writer 14 transmits/receives data to/from the IC card 2 through the wireless communication. Therefore, the card reader/writer 14 includes a signal processing unit, a transmission/reception circuit, an antenna and others which are not shown in the drawing.

The signal processing unit executes coding, decoding, modulation and demodulation of data that is transmitted/received to/from the IC card 2. The transmission/reception circuit amplifies data modulated by the signal processing unit and data received from the antenna.

The antenna generates a magnetic field in accordance with transmission data to supply the data to the IC card 2. Further, the antenna recognizes data transmitted from the IC card 2 based on an induced current generated by the electromagnetic induction.

A range where the IC card 2 can recognize a change in magnetic field caused by the antenna is a communication enabled range. The card reader/writer 14 detects the IC card 2 that is present in this communication enabled range to execute processing.

The control unit 11 transmits an initial response request (an initial response request command) to the IC card 2 by using the card reader/writer 14 to configure a setting concerning communication with the IC card 2. To detect the IC card 2, the card reader/writer 14 repeatedly transmits the initial response request command to the communication enabled range.

When the IC card 2 is present in the communication enabled range, a response to an activation command from the IC card 2 is sent to the card reader/writer 14. As a result, the card reader/writer 14 detects the IC card 2. Here, the card reader/writer 14 transmits a selection command that is utilized to select a desired IC card 2. As a result, communication can be achieved between the card reader/writer 14 and the IC card 2.

Figure 3:
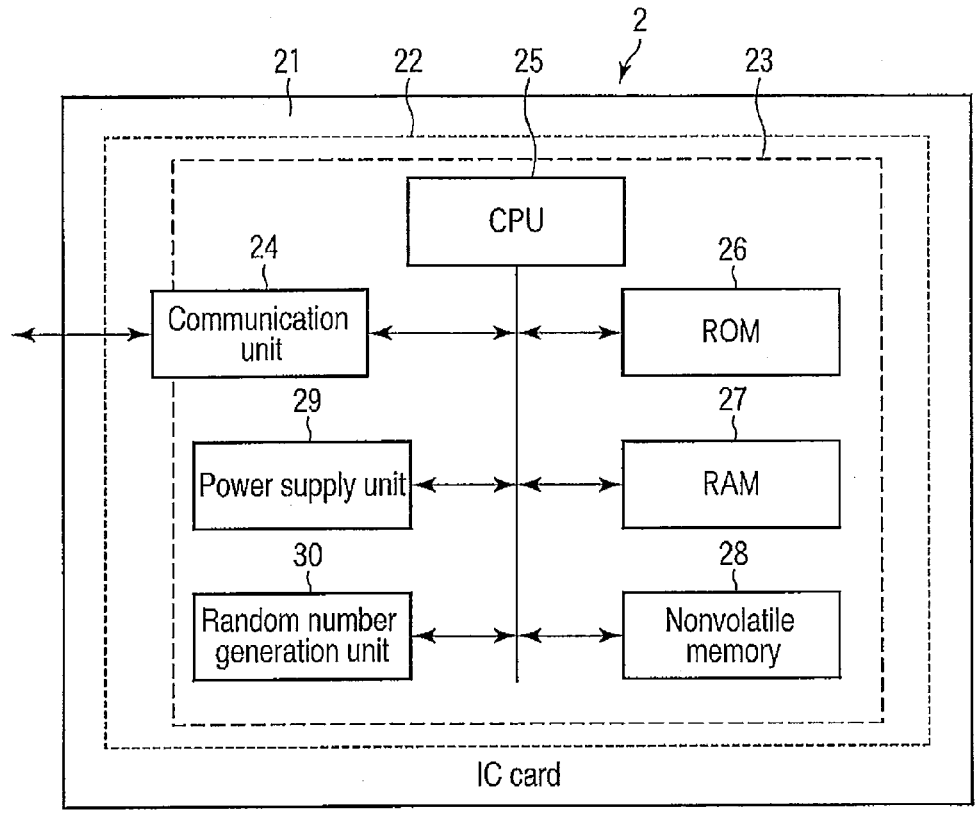
FIG. 3 is an explanatory diagram for explaining a structural example of an IC card depicted in FIG. 1.

FIG. 3 is a block diagram for explaining a structural example of the IC card 2 depicted in FIG. 1.

As shown in FIG. 3, the IC card 2 includes a card-like main body 21 and an IC module 22 built in the main body 21. The IC module 22 includes one or more IC chips 23 and a communication unit 24. The IC chip 23 and the communication unit 24 are formed in the IC module 22 in a state where the IC chip 23 and the communication unit 24 are connected to each other.

The IC chip 23 includes a communication unit 24, a CPU 25, an ROM 26, an RAM 27, a nonvolatile memory 28, a power supply unit 29, a random number generation unit 30 and others.

The communication unit 24 is an interface configured to execute contactless communication with the card reader/writer 14 in the terminal device 1. The communication unit 24 functions as a transmission unit and a reception unit.

Moreover, the communication unit 24 includes an antenna that performs contactless communication with the card reader/writer 14 in the terminal device 1. Additionally, the communication unit 24 includes a transmission/reception circuit that amplifies transmission/reception data and a signal processing unit.

The CPU 25 functions as a control unit that controls the overall IC card 2. Further, the CPU 25 functions as a determination unit that makes various kinds of determination. The CPU 25 executes various kinds of processing based on a control program and control data stored in the ROM 26 or the nonvolatile memory 28. For example, it executes various kinds of processing in accordance with commands received from the card reader/writer 14 and generates data such as a response as a processing result.

The ROM 26 is a nonvolatile memory that stores a control program and control data in advance. The ROM 26 is incorporated in the IC card 2 in a state that the ROM 26 stores the control program, the control data and others on a manufacturing stage. That is, the control program and the control data stored in the ROM 26 are incorporated in accordance with a specification of the IC card 2 in advance.

The RAM 27 is a nonvolatile memory that functions as a working memory. The RAM 27 temporarily stores, e.g., data that is being processed by the CPU 25. For example, the RAM 27 temporarily stores data received from the terminal device 1 via the communication unit 24. Furthermore, the RAM 27 temporarily stores a program executed by the CPU 25.

The nonvolatile memory 28 is constituted of a nonvolatile memory such as an EEPROM or a flash ROM in which data can be written and rewritten. The nonvolatile memory 28 stores a control program and various kinds of data in accordance with an intended operational purpose of the IC card 2.

For example, in the nonvolatile memory 28, a program file, a data file and other files are created. In each created file, a control program, various kinds of data and others are written. The CPU 25 can realize various kinds of processing by executing a program stored in the nonvolatile memory 28 or the ROM 26.

The power supply unit 29 receives electric waves from the card reader/writer 14 to generate electromotive force and an operation clock. The power supply unit 29 supplies the generated electric power and operation clock to each unit in the IC card 2. When each unit in the IC card 2 has received the electric power supplied thereto, it enters an operable state.

The random number generation unit 30 generates a random number. For example, when receiving the initial response request command from the card reader/writer 14, the CPU 25 generates a random number by using the random number generation unit 30.

The initial response request command transmitted from the card reader/writer 14 has a plurality of parameters which are utilized to determine a communication system, a speed and others. The parameters include information indicative of the number of time frames (a total time frame number n) in which the card reader/writer 14 accepts a response to the initial response request command.

That is, the control unit 11 in the terminal device 1 sets a plurality of time frames and transmits the initial response request command having the information indicative of the total time frame number to the IC card 2 from the card reader/writer 14.

When receiving the initial response request command, the CPU 25 in the IC card 2 makes reference to the initial response request command and recognizes the total time frame number set by the card reader/writer 14. That is, the CPU 25 functions as a recognition unit. The CPU 25 generates a random number by using the random number generation unit 30 and selects one time frame based on the generated random number. That is, the CPU 25 functions as a time frame selection unit. The CPU 25 in the IC card 2 executes initial response processing with respect to the initial response request command based on the selected time frame.

Further, when transmitting data to the card reader/writer 14, the IC card 2 generates a magnetic field associated with transmission data by using the communication unit 24. The IC card 2 can determine whether communication processing is being executed in another IC card 2 by monitoring the magnetic field through the communication unit 24.

For example, when detecting a change in magnetic field by using the communication unit 24 in a state that data is not received from the card reader/writer 14, the CPU 25 in the IC card 2 determines that the communication processing is being executed in another IC card 2. That is, the communication unit 24 and the CPU 25 function as communication detection units.

Initial response processing according to the first embodiment will now be described.

Figure 4:
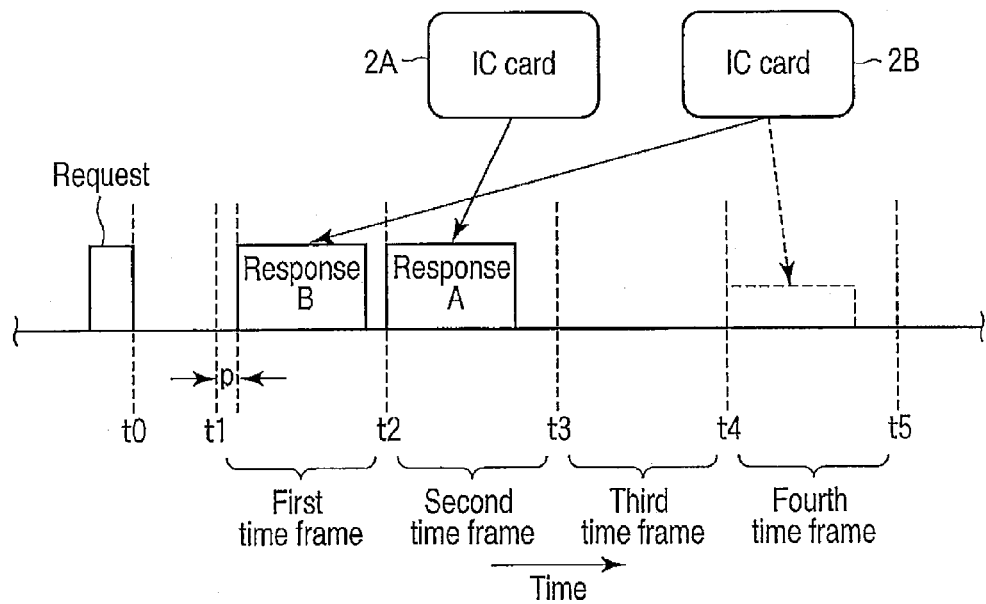
FIG. 4 is an explanatory diagram for schematically explaining an example of processing of an IC card according to a first embodiment.

FIG. 4 is an explanatory diagram for schematically explaining an example of the initial response processing of the IC card 2 according to the first embodiment. It is to be noted that a description will be given on the assumption that the terminal device 1 has set the total time frame number to 4 in this example. Furthermore, a description will be also given on the assumption that the number of the IC cards 2 present in the communication enabled range of the terminal device 1 is two, i.e., an IC card 2A and an IC card 2B.

The terminal device 1 sets the total time frame number and transmits an initial response request command (a request) from the card reader/writer 14 at a given timing.

The terminal device 1 starts acceptance of a first time frame at a time t1 provided when a predetermined time (t1−t0) passes from a time t0 at which a last bit of the request is transmitted.

Moreover, the terminal device 1 starts acceptance of a second time frame at a time t2 provided when a predetermined time (t2−t1) passes from the start of acceptance of the first time frame.

Additionally, the terminal device 1 starts acceptance of a third time frame at a time t3 provided when a predetermined time (t3−t2) passes from the start of acceptance of the second time frame.

Further, the terminal device 1 starts acceptance of a fourth time frame at a time t4 provided when a predetermined time (t4−t3) passes from the start of acceptance of the third time frame.

The terminal device 1 ends the acceptance of the fourth time frame at a time t5 provided when a predetermined time (t5−t4) passes from the start of acceptance of the fourth time frame.

It is to be noted that time widths of the respective time frames set by the terminal device 1 all have the same length T. That is, a relationship t2−t1=t3−t2=t4−t3=t5−t4=T is achieved.

The IC cards 2A and 2B wait until they receive a request from the terminal device 1. When receiving the request, the CPU 25 of each of the IC cards 2A and 2B recognizes the total time frame number set by the terminal device 1.

The CPU 25 determines that the time t1 provided when the predetermined time (t1−t0) elapses from the time t0 at which the last bit of the request is received as a start time of the first time frame. The CPU 25 recognizes the respective continuous time frames based on the start time t1 of the first time frame and the recognized total time frame number. That is, the CPU 25 sections the time from the time t1 in accordance with the time width T to recognize each time frame. As a result, the CPU 25 recognizes the start times t1, t2, t3 and t4 of the respective time frames.

Further, the CPU 25 provides each recognized time frame with a number. The CPU 25 generates a random number by using the random number generation unit 30 and selects one time frame based on the generated random number. For example, the CPU 25 converts a part or all of generated random numbers into numerical values equal to or smaller than the total time frame number set by the terminal device 1. The CPU 25 selects a time frame to which the number corresponding to the numeral value converted from each random number is given.

In this embodiment, the CPU 25 determines a time frame in which a response is transmitted based on a time frame m selected from the random number and the total time frame number n.

The CPU 25 first determines whether m>n/2 is satisfied or not. When m>n/2 is satisfied, the CPU 25 reselects a time frame n−m+1. The CPU 25 monitors the reselected time frame n−m+1 so that a response can be transmitted in the reselected time frame.

The CPU 25 determines whether a response is transmitted to the terminal device 1 from the other IC card 2 within a predetermined time width p from a start time of the time frame n−m+1. That is, the CPU 25 monitors a magnetic field by using the communication unit 24 from the start time of n−m+1 and determines whether a change in magnetic field that is equal to or above a predetermined value is present within the time width p.

When it is determined that there is no response from the other IC card 2, the CPU 25 transmits a response to the terminal device 1. Furthermore, when it is determined that the other IC card 2 has made a response, the CPU 25 transmits a response to the terminal device 1 in the first selected time frame m.

Moreover, when the first time frame m selected by the CPU 25 does not meet m>n/2, the CPU 25 transmits a response to the terminal device 1 in the first selected time frame m.

FIG. 4 shows an example where the total time frame number n=4, the IC card 2A selects a second time frame and the IC card 2B selects a fourth time frame.

Since m=2 is achieved, the IC card 2A does not meet a relationship of m>n/4. Therefore, the IC card 2A controls to start transmission of a response from the time t2 which is a start time of the second time frame.

Additionally, since m=4 is achieved, the IC card 2B meets the relationship of m>n/2. Therefore, IC card 2B reselects a time frame associated with n−m+1=1. That is, the IC card 2B reselects the first time frame. In this case, the IC card 2B controls to start transmission of a response from a time t1+p after a predetermined time p from the time t1 which is the start time of the first time frame.

Figure 5:
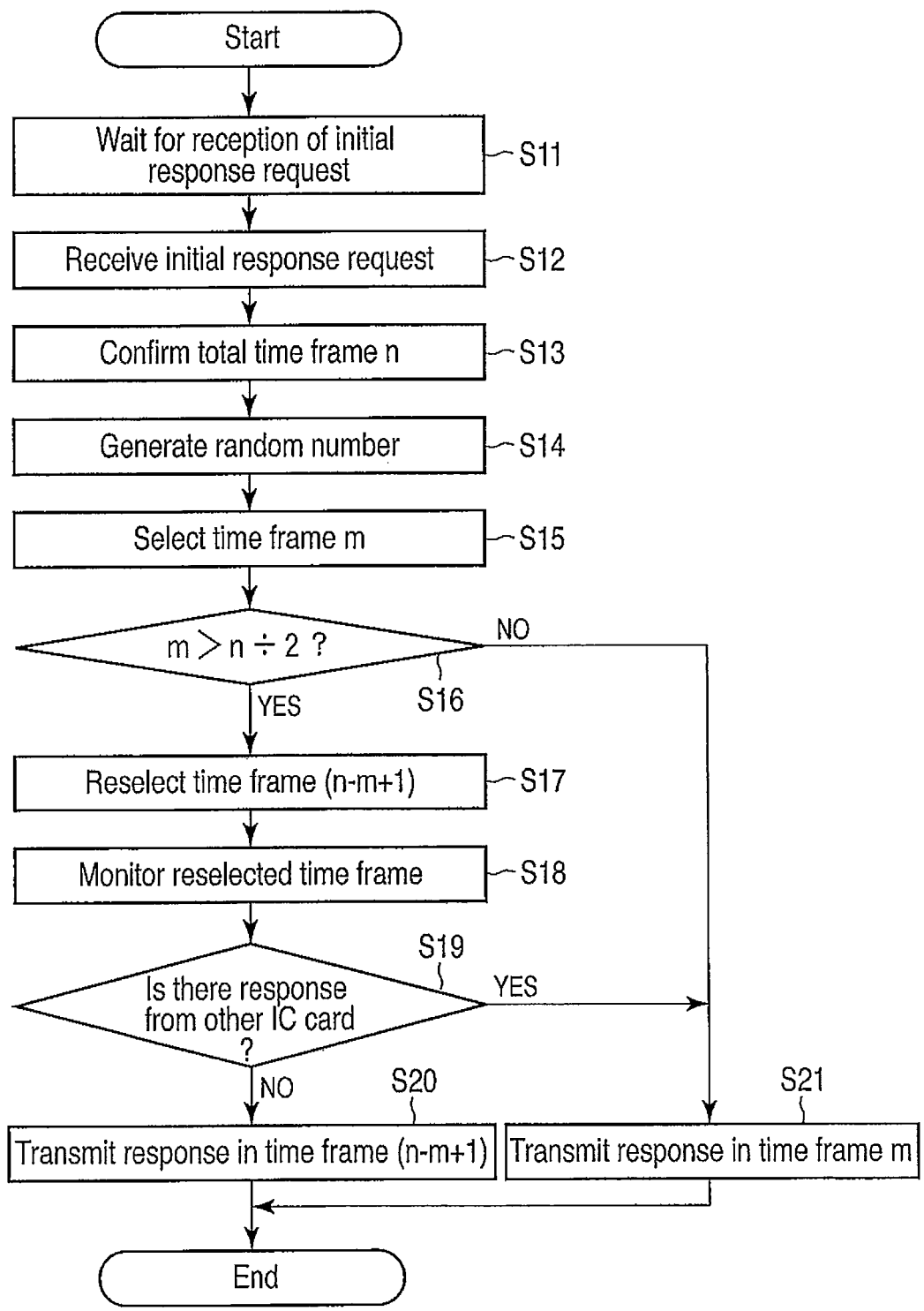
FIG. 5 is a flowchart for explaining the example of the processing of the IC card according to the first embodiment.

FIG. 5 is a flowchart for explaining an example of initial response processing of the IC card 2 according to the first embodiment.

The IC card 2 waits until it receives a request from the terminal device 1 (a step S11). When receiving the request (a step S12), the CPU 25 of the IC card 2 recognizes the total time frame number n set by the terminal device 1 (a step S13).

The CPU 25 generates a random number by using the random number generation unit 30 (a step S14). The CPU 25 selects one time frame m based on the random number generated by the random number generation unit 30 (a step S15).

The CPU 25 determines whether the selected time frame m and the total time frame number n meet the relationship of m>n/2 (a step S16).

When the selected time frame m and the total time frame number n meet the relationship of m>n/2 (the step S16, YES), the CPU 25 reselects the time frame of n−m+1 (a step S17). The CPU 25 monitors the reselected time frame n−m+1 (a step S18).

The CPU 25 determines whether the other IC card 2 transmits a response to the terminal device 1 within the predetermined time width p from the start time of the time frame n−m+1 (a step S19).

When it is determined that there is no response from the other IC card 2 (the step S19, NO), the CPU 25 transmits a response to the terminal device 1 (a step S20). That is, the CPU 25 controls each unit in the IC card 2 to transmit a response to the terminal device 1 in the reselected time frame.

Further, when the selected time frame m and the total time frame number n do not meet the relationship of m>n/2 at the step S16 (the step S16, NO), or when it is determined that there is a response from the other IC card 2 at the step S19 (the step S19, YES), the CPU 25 controls each unit in the IC card 2 to transmit a response to the terminal device 1 in the first selected time frame m (a step S21).

As described above, when the IC card 2 according to this embodiment has received the initial response request command, it recognizes the total time frame number based on the command. The IC card 2 selects the time frame based on the random number and reselects a predetermined time frame that precedes the selected time frame. The IC card 2 determines whether the reselected time frame is selected by the other IC card 2, and it transmits a response to the terminal device 1 in this time frame when the reselected time frame is not selected. As a result, a processing time can be reduced.

Further, when the reselected time frame is selected by the other IC card 2, the IC card 2 transmits a response to the terminal device 1 in the first selected time frame. As a result, the collision can be avoided.

Consequently, the portable electronic apparatus that can execute processing at a higher speed and the control method of the portable electronic apparatus can be provided.

Initial response processing according to a second embodiment will now be described.

FIG. 6 is an explanatory diagram for schematically explaining an example of the initial response processing of an IC card 2 according to the second embodiment. It is to be noted that a description will be given as to an assumption that a terminal device 1 has set a total time frame number to 4 in this example. Furthermore, a description will be also given as to an assumption that IC cards 2 that are present in a communication enabled range of the terminal device 1 are two card, i.e., an IC cards 2A and an IC card 2B.

The terminal device 1 sets a total time frame number and transmits an initial response request command (a request) from a card reader/writer 14 at a given timing.

The terminal device 1 starts acceptance of a first time frame at a time t1 provided when a predetermined time (t1−t0) passes from a time t0 at which a last bit in the request is transmitted.

Further, the terminal device 1 starts acceptance of a second time frame at a time t2 provided when a predetermined time (t2−t1) passes from the start of acceptance of the first time frame.

Furthermore, the terminal device 1 starts acceptance of a third time frame at a time t3 provided when a predetermined time (t3−t2) passes from the start of acceptance of the second time frame.

Moreover, the terminal device 1 starts acceptance of a fourth time frame at a time t4 provided when a predetermined time (t4−t3) passes from the start of acceptance of the third time frame.

The terminal device 1 terminates the acceptance of the fourth time frame at a time t5 provided when a predetermined time (t5−t4) passes from the start of acceptance of the fourth time frame.

It is to be noted that time widths of the respective time frames set by the terminal device 1 all have the same length T. That is, a relationship of t2−t1=t3−t2=t4−t3=t5−t4=T is achieved.

The IC cards 2A and 2B wait until they receive a request from the terminal device 1. When receiving the request, a CPU 25 of each of the IC cards 2A and 2B recognizes the total time frame number set by the terminal device 1.

The CPU 25 determines that the time t1 provided when the predetermined time (t1−t0) passes from the time t0 at which the last bit in the request is received as a start time of the first time frame. The CPU 25 recognizes the respective continuous time frames based on the start time t1 of the first time frame and the recognized total time frame number. That is, the CPU 25 sections the time from the time t1 in accordance with the time width T and recognizes each time frame. As a result, the CPU 25 recognizes the start times t1, t2, t3 and t4 of the respective time frames.

Moreover, the CPU 25 provides each recognized time frame with a number. The CPU 25 generates a random number by using a random number generation unit 30 and selects one time frame based on the generated random number. For example, the CPU 25 converts a part or all of generated random numbers into numerical values equal to or smaller than the total time frame number set by the terminal device 1. The CPU 25 selects a time frame to which the number corresponding to the numeral value converted from each random number is given.

The CPU 25 monitors a time frame K that precedes a time frame m selected based on each random number. For example, the CPU 25 sequentially performs monitoring starting from the time frame K (K=1). It is to be noted that the CPU 25 carries out the monitoring in a range of the time frame K≤m. Additionally, an initial value of the time frame K is preset and stored in, e.g., an ROM 26.

Further, the CPU 25 performs the monitoring during a predetermined time P in each time frame. For example, assuming that a time required for the CPU 25 to determine whether the other IC card is performing communication is p, the CPU 25 carries out the monitoring during a predetermined time P=p·(m−K) in each time frame.

When the CPU 25 has detected the communication carried out by the other IC card 2 during the monitoring, it adds 1 to K and monitors the next time frame. When it is determined that there is no response from the other IC card 2 during the monitoring time, the CPU 25 transmits a response to the terminal device 1 after end of the monitoring time.

FIG. 6 shows an example where the total time frame number n=4, the IC card 2A selects a second time frame and the IC card 2B selects a fourth time frame.

The IC card 2A first monitors the first time frame. In this case, since K=1 and m=2 are achieved, the IC card 2A carries out the monitoring during the time width p. The IC card 2A confirms that there is no response from the other IC card 2B during the time width p from the start time t1 of the first time frame. The IC card 2A controls to start transmission of a response after end of the monitoring time (the time t1+p).

Further, the IC card 2B first monitors the first time frame. In this case, since K=1 and m=4 are achieved, the IC card 2B carries out the monitoring during the time width 3*p*. The IC card 2B detects that the IC card 2A transmits a response to the terminal device 1 at the time t1+p. Therefore, the IC card 2B proceeds to the monitoring of the next time frame (the second time frame).

In this case, since K=2 and m=4 are achieved, the IC card 2B performs the monitoring during a time width 2*p*. The IC card 2B confirms that there is no response from the other IC card 2A during the time width 2*p* from the start time t2 of the second time frame. The IC card 2B controls to start transmission of a response after end of the monitoring time (the time t2+2p).

FIG. 7 is a flowchart for explaining an example of initial response processing of the IC card 2 according to the second embodiment.

The IC card 2 waits until it receives a request from the terminal device 1 (a step S31). When receiving the request (a step S32), the CPU 25 of the IC card 2 recognizes the total time frame number n set by the terminal device 1 (a step S33).

The CPU 25 generates a random number by using the random number generation unit 30 (a step S34). The CPU 25 selects one time frame m based on the random number generated by the random number generation unit 30 (a step S35).

The CPU 25 monitors the time frame K that precedes the time frame m selected based on the random number (a step S36). In this case, the CPU 25 carries out the monitoring during a predetermined time P=p·(m−K) in the time frame K.

The CPU 25 determines whether the other IC card 2 transmits a response to the terminal device 1 during the predetermined time P (a step S37).

When communication performed by the other IC card 2 is detected during the monitoring at the step S37 (the step S37, YES), the CPU 25 adds 1 to K (a step S38) and monitors the next time frame.

Further, when the communication performed by the other IC card 2 is not detected during the monitoring at the step S37 (the step S37, NO), the CPU 25 controls each unit in the IC card 2 to transmit a response to the terminal device 1 after end of the monitoring time (a step S39).

As described above, when the IC card 2 according to this embodiment has received the initial response request command, it recognizes the total time frame number based on the command. The IC card 2 selects a time frame based on the random number and retrieves a time frame which precedes the selected time frame and is not selected by the other IC card 2. When the time frame which is not selected by the other IC card 2 is detected, the IC card 2 transmits a response to the terminal device 1 in this time frame. As a result, a processing time can be reduced.

Furthermore, the CPU 25 of the IC card 2 executes control in such a manner that the monitoring time P in each time frame is reduced as a value of the first selected time frame m is smaller. As a result, the collision can be avoided.

Consequently, the portable electronic apparatus that can execute processing at a higher speed and the control method of the portable electronic apparatus can be provided.

A portable electronic apparatus according to a third embodiment will now be described hereinafter in detail with reference to the drawings.

FIG. 8 is a diagram for explaining a structural example of an IC card 2 according to a third embodiment.

The IC card 2 includes a card-like main body 21 and an IC module 22 built in the main body 21. Furthermore, in the IC module 22 are provided a CPU 101, an ROM 102, an RAM 103, a nonvolatile memory 104, a resonance unit 105, a transmission unit 106, a reception unit 107, a power supply unit 108 and a logic unit 109.

The CPU 101 functions as a control unit that controls the entire IC card 2. The CPU 101 executes various kinds of processing based on a control program and control data stored in the ROM 102 or the nonvolatile memory 104. For example, it executes various kinds of processing in accordance with commands received from a card reader/writer 14 and generates data such as a response as a processing result.

The ROM 102 is a nonvolatile memory that stores a control program and control data in advance. The ROM 102 is incorporated in the IC card 2 in a state that the ROM 102 stores the control program, the control data and others on a manufacturing stage. That is, the control program and the control data stored in the ROM 102 are incorporated in accordance with a specification of the IC card 2 in advance.

The RAM 103 is a nonvolatile memory that functions as a working memory. The RAM 103 temporarily stores, e.g., data that is being processed by the CPU 101. For example, the RAM 103 temporarily stores data received from the terminal device 1 via the reception unit 107. Furthermore, the RAM 103 temporarily stores a program executed by the CPU 101.

The nonvolatile memory 104 is constituted of a nonvolatile memory such as an EEPROM or a flash ROM in which data can be written and rewritten. The nonvolatile memory 104 stores a control program and various kinds of data in accordance with an intended operational purpose of the IC card 2.

For example, in the nonvolatile memory 104, a program file, a data file and others are created. In each created file, a control program, various kinds of data and others are written. The CPU 101 can realize various kinds of processing by executing a program stored in the nonvolatile memory 104 or the ROM 102.

The transmission unit 106 and the reception unit 107 are interfaces configured to perform contactless communication with the card reader/writer 14 of the terminal device 1. The transmission unit 106 performs coding, modulation and others and transmits data. The reception unit 107 performs demodulation and decoding after receiving data.

The resonance unit 105 includes, e.g., an antenna that carries out contactless communication with the card reader/writer 14 of the terminal device 1. Furthermore, the resonance unit 105 includes a transmission/reception circuit and a signal processing unit that amplifies transmission/reception data.

The power supply unit 108 receives electric waves from the card reader/writer 14 to generate electromotive force and an operation clock. The power supply unit 108 supplies the generated electric power and operation clock to each unit in the IC card 2. When each unit in the IC card 2 has received the electric power supplied thereto, it enters an operable state.

The logic unit 109 realizes various functions such as arithmetic operations, random number generation and others. For example, when an initial response request is received from the card reader/writer 14, the logic unit 109 generates a random number.

Operations of the IC card 2 in this embodiment will now be described.

The IC card 2 executes operations that differ depending on a case of responding to a first initial response request in which 2 or a higher value is specified as a total number N of slots and a case of responding to an initial response request in which a slot to be transmitted later is specified.

Figure 9:
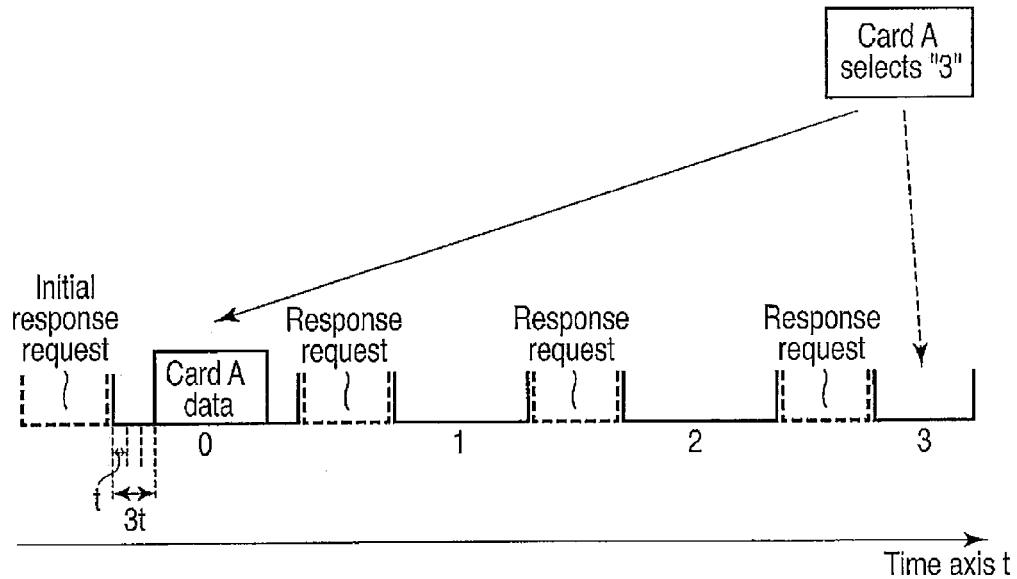
FIG. 9 is a diagram for explaining an operation of an IC card 2 when responding to a first initial response request in which 2 or a higher value is specified as a total number N of slots.

FIG. 9 is a diagram for explaining an operation of the IC card 2 when responding to the first initial response request in which 2 or a higher value is specified as the total number N of slots. FIG. 9 shows an operation of a card A when the total number N=4 of slots specified by the terminal device 1.

In this case, the card A recognizes that four slots, i.e., "a slot 0", "a slot 1", "a slot 2" and "a slot 3" are set in the terminal device 1. The IC card A generates a random number by using the logic unit 109 and selects a value n indicative of a slot associated with the generated value. In this case, "the slot 0" is associated with n=0, "the slot 1" is associated with n=1, "the slot 2" is associated with n=2 and "the slot 3" is associated with n=3, respectively.

According to the example depicted in FIG. 9, the IC card A selects n=3 based on the generated random number after receiving the first initial response request from the terminal device 1. Therefore, the card A responds when a slot marker command specifying 3 as a slot is received under normal circumstances as indicated by an arrow of a dotted line in FIG. 9.

However, the card A checks whether it can respond to 0 as a slot, i.e., the first initial response request. Thus, after receiving the first initial response request, the card A determines whether the other IC card 2 has transmitted a response in each slot.

For example, if an order of a slot to be monitored is s, the IC card 2 monitors whether the other IC card 2 makes an initial response during a time t×(n−s) after receiving a response request indicative of each slot. In this case, "the slot 0" is associated with s=0, "the slot 1" is associated with s=1, "the slot 2" is associated with s=2 and "the slot 3" is associated with s=3, respectively.

According to the example depicted in FIG. 9, the IC card 2 selects n=3 and monitors the slot 0 (s=0). In this case, the IC card 2 monitors whether the other IC card 2 makes an initial response during a time t×(n−s)=3t after receiving the response request indicative of the slot 0.

It is to be noted that the card A can determine whether the other IC card 2 is executing communication processing by detecting a change in magnetic field by using an antenna provided to the resonance unit 105.

If it is revealed that the other IC card 2 is making a response during this time 3t, the other IC card 2 that has selected the slot 0 to the slot 2 is present. On the other hand, if the other IC card 2 does not make a response during this time 3t, the card A has selected the smallest n. In this case, the IC card A can respond to the first initial response request. That is, the IC card A transmits a response to the terminal device 1 in the slot 0.

Thus, when the card A has recognized that there is no initial response from the other contactless Ic card before the time 3t passes, it makes the initial response after elapse of the time 3t. In FIG. 9, an arrow of a solid line indicates that the card A responds to the first initial response request.

Figure 10:
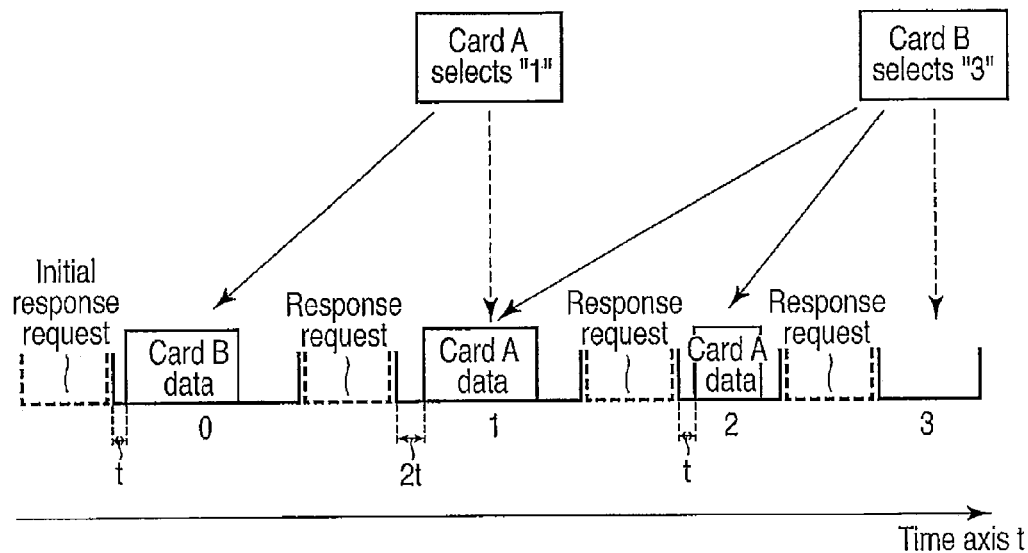
FIG. 10 is a diagram for explaining an operation of the IC card 2 when responding to a second or subsequent initial response request in which 2 or a higher value is specified as the total number N of slots.

When the card A has recognized that the other contactless IC card made the initial response before the time 3t passes, it executes an operation depicted in FIG. 10.

FIG. 10 is a diagram for explaining an operation of the IC card 2 when responding to a second or subsequent initial response request in which 2 or a higher value is specified as the total number N of slots. In FIG. 10, in a case where the total number. N=4 of slots specified from the terminal device 1, the card A selects the number n (n=3) as shown in FIG. 9, and the card B selects the number n (n=1).

In FIG. 9, as the described above about the card A, the card B monitors a response from the other IC card 2 before a time t×(n−s)=t i^s ended in the slot 0 after receiving the first initial response request. The card B recognizes that there is no response from the other IC card 2 and makes a response after elapse of the time t.

After receiving the first initial response request, the card A monitors a response from the other IC card 2 during a time t×(n−s)=3t in the slot 0. At this time, since there is a response from the card B, the card A recognizes that there is a response from the other IC card 2 and does not make a response.

Thereafter, the terminal device 1 issues a second or subsequent initial response request with respect to the contactless IC card that has selected the slot 1 (n=1). When receiving the second or subsequent response request indicating the slot 1, the card A monitors a response from the other IC card 2 until a time t×(n−s)=2t passes. When the card A recognizes that there is no response from the other IC card 2 until the time 2t passes, it responds to the terminal device 1 in the slot 1.

On the other hand, when the card A has recognized that the other IC card 2 made a response in regard to the slot 1 before the time 2t passes, it monitors the slot 2. That is, when receiving the second or subsequent initial response request (the third initial response request in this case) indicating the slot 2 (n=2), the card A monitors a response from the other IC card 2 until a time t×(n−s)=t passes. When the card A recognizes that there is no response from the other IC card 2 before the time t passes, it responds to the terminal device 1.

Further, when the card A has recognized that the other IC card 2 made a response in regard to the slot 2 before the time t passes, it responds to the terminal device 1 without delay after receiving the response request from the terminal device 1 specifying the slot 3 in accordance with a first slot selection result.

FIG. 11 is a flowchart showing an operation of the IC card 2 when responding to the initial response request in which 2 or a higher value is specified as the total number N of the slots.

At a step S41, the Ic card 2 waits until it receives the initial response request from the terminal device 1. At a step S42, the total slot number N is specified in the received initial response request from the terminal device 1. At a step S43, the IC card 2 determines the value specified in the initial response request as N and selects an arbitrary number n in numbers from 0 to (N−1) by utilizing the logic unit 109 to generate a random number.

It is to be noted that the respective slots in this example are provided with numbers, i.e., the slot 0 to the slot 3. Therefore, although a description will be given as to the IC card 2 configured to select n from the numbers from 0 to N−1, the embodiment is not restricted to this configuration. When the respective slots are provided with the numbers, i.e., the slot 1 to the slot 4, the IC card 2 selects n from numbers ranging to N.

At a step S44, whether the selected number n is 0 is checked. In case of Yes at the step S44, i.e., when n is 0, the IC card 2 immediately makes a response at a step S45. In case of No at the step S44, i.e., when n is not 0, the processing advances to a step S46.

At the step S46, the IC card 2 determines a fixed time as t after receiving the initial response request from the terminal device 1 and monitors whether there is a response from the other IC card 2 until a time t×(n−s) passes. It is to be noted that a value "s" corresponds to the number of a slot to be monitored.

In case of YES at the step S46, i.e., when it has been recognized that there is a response from the other IC card 2 within the monitoring time t×(n−s), the IC card 2 waits for reception of the next response request transmitted from the terminal device 1 at a step S47.

When the IC card receives the response request indicative of the next slot at the step S47, 1 is added to s at a step S48, and the processing forms a loop to the step S46. That is, the IC card 2 again shifts to a state where the next slot is monitored. Here, the IC card 2 again determines whether there is a response from the other IC card 2 within the monitoring time t×(n−s).

On the other hand, in case of NO at the step S46, i.e., when it has been recognized that there is no response from the other IC card 2 within the monitoring time t×(n−s), the IC card 2 transmits a response to the terminal device 1 at a step S49. That is, the IC card 2 receives the response request and transmits a response to the terminal device 1 after elapse of the time t×(n−s) from the start time of the slot.

It is to be noted that the description has been given as to the configuration where the IC card 2 determines to immediately send a response to the terminal device 1 when n=0, but the embodiment is not restricted to this configuration. The IC card 2 may be configured to shift to the step S46 and effect monitoring for the time t·(n−s) when n=0. In this case, since t·(n−s)=0·t is achieved, the IC card 2 carries out processing of transmitting a response to the terminal device 1 from the beginning of the start time of the time frame of the slot 0.

As described above, in each embodiment, even at the time of receiving the initial response request for the IC card 2 which has selected the number m that is smaller than the selected number n, presence/absence of a response from the other IC card 2 is monitored, and a response operation is carried out in accordance with a result of this monitoring.

Therefore, the IC card 2 can reduce the initial response communication time as compared with the conventional slot marker system.

It is to be noted that, when a collision occurs in the response operation, the terminal device 1 can again transmit, the first initial response request to the IC card 2.

It is to be noted that the functions described in each of the foregoing embodiments can be configured by not only using hardware but also utilizing software to read a program having each function written therein into a computer. Furthermore, each function may be configured by appropriately selecting one of the software and the hardware.

Although the several embodiments according to the present invention have been described, these embodiments are presented as examples, and they are not intended to restrict the scope of the invention. These novel embodiments can be carried out in other various conformations, and they can be omitted, substituted or changed in many ways without departing from the scope of the invention. These embodiments and deformations thereof are included in the scope or the gist of the present invention and also included in the invention described in claims and an equal scope thereof.

According to an embodiment, the portable electronic apparatus that can execute processing at a high speed and the control method of the portable electronic apparatus can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable electronic apparatus which generates a random number and makes a response at a timing associated with the generated random number, the portable electronic apparatus comprising:
   a reception unit which receives an initial response request from an external device;
   a recognition unit which recognizes a total timeframe number set in the external device based on the initial response request received by the reception unit;
   a random number generation unit which generates a random number;
   a communication detection unit which detects communication performed in another portable electronic apparatus;
   a determination unit which monitors one timeframe by using the communication detection unit based on the total timeframe number recognized by the recognition unit and the random number generated by the random number generation unit, and determines whether a response to the initial response request is to be transmitted to the external device based on a detection result obtained by the communication detection unit;
   a transmission unit which transmits the response to the external device based on a determination result obtained by the determination unit; and
   a timeframe selection unit which selects a timeframe based on the total timeframe number recognized by the recognition unit and the random number generated by the random number generation unit;

wherein, when a relationship of m>n/2 is satisfied, the determination unit reselects a timeframe associated with a number n−m+1, where n is the total timeframe number set by the external device and m is a number of the timeframe selected by the timeframe selection unit, monitors the timeframe reselected by the communication detection unit and determines whether a response to the initial response request is to be transmitted to the external device based on a detection result obtained by the communication detection unit.

2. The apparatus according to claim 1, characterized in that the determination unit determines whether communication is carried out in another portable electronic apparatus within a predetermined time from a start time of the reselected timeframe based on a detection result obtained by the communication detection unit.

3. The apparatus according to claim 1, characterized in that, when the determination unit determines that the communication is not performed in another portable electronic apparatus within the predetermined time from the start time of the reselected timeframe, it determines to transmit a response to the external device in the reselected timeframe.

4. The apparatus according to claim 1, characterized in that, when the determination unit determines that the communication is carried out in another portable electronic apparatus within the predetermined time from the start time of the reselected timeframe, it determines to transmit a response to the external device within the timeframe selected by the timeframe selection unit.

5. A portable electronic apparatus which generates a random number and makes a response at a timing associated with the generated random number, the portable electronic apparatus comprising:
- a reception unit which receives an initial response request from an external device;
- a recognition unit which recognizes a total timeframe number set in the external device based on the initial response request received by the reception unit;
- a random number generation unit which generates a random number;
- a communication detection unit which detects communication performed in another portable electronic apparatus;
- a determination unit which monitors one timeframe by using the communication detection unit based on the total timeframe number recognized by the recognition unit and the random number generated by the random number generation unit, and determines whether a response to the initial response request is to be transmitted to the external device based on a detection result obtained by the communication detection unit;
- a transmission unit which transmits the response to the external device based on a determination result obtained by the determination unit; and
- a timeframe selection unit which selects a timeframe based on the total timeframe number recognized by the recognition unit and the random number generated by the random number generation unit;

wherein the determination unit reselects one timeframe satisfying a relationship of K≤m, determines whether the communication is carried out in another portable electronic apparatus within a predetermined time from a start time of the reselected timeframe based on a detection result obtained by the communication detection unit, performs monitoring by using the communication detection unit during a period of p·(m−K) from the start time of the reselected timeframe, where m is a number of the timeframe selected by the timeframe selection unit and K is a number of the timeframe to be reselected and p is a time required for detection performed by the communication detection unit; and when the determination unit determines that the communication is not performed in another portable electronic apparatus during the period of p·(m−K) from the start time of the reselected timeframe, the determination unit determines to transmit a response to the external device in the reselected timeframe.

6. The apparatus according to claim 5, wherein, when the determination unit determines that the communication is performed in another portable electronic apparatus within the predetermined time from the start time of the reselected timeframe, it adds 1 to K which is a number of the reselected timeframe.

7. A portable electronic apparatus which generates a random number and makes a response at a timing associated with the generated random number, the portable electronic apparatus by comprising:
- a reception unit which receives an initial response request from an external device;
- a recognition unit which recognizes a total timeframe number set in the external device based on the initial response request received by the reception unit;
- a random number generation unit which generates a random number;
- a communication detection unit which detects communication performed in another portable electronic apparatus;
- a determination unit which monitors one timeframe by using the communication detection unit based on the total timeframe number recognized by the recognition unit and the random number generated by the random number generation unit, and determines whether a response to the initial response request is to be transmitted to the external device based on a detection result obtained by the communication detection unit;
- a transmission unit which transmits the response to the external device based on a determination result obtained by the determination unit; and
- a logic unit which generates a natural number n based on the total timeframe number recognized by the recognition unit and the random number generated by the random number generation unit, wherein the determination unit determines a predetermined time as t, recognizes a number s indicative of a timeframe based on a response request received by the reception unit, performs monitoring by using the communication detection unit during a period of t·(n−s) from a start time of a timeframe represented by the response request, and determines whether a response to the initial response request is to be transmitted to the external device based on a detection result of the communication detection unit; and when the determination unit determines whether communication is carried out in another portable electronic apparatus during the period of t·(n−s) from the start time of the timeframe represented by the response request based on the detection result obtained by the communication detection unit and determines that the communication is not performed in another portable electronic apparatus, the determination unit determines to transmit a response to the external device in the timeframe represented by the response request.

8. The apparatus according to claim 1, further comprising:
an IC module comprising the respective units; and
a main body in which the IC module is installed.

* * * * *